United States Patent [19]
Janssens et al.

[11] Patent Number: 5,422,334
[45] Date of Patent: Jun. 6, 1995

[54] DYE-DONOR ELEMENTS FOR THERMAL DYE TRANSFER RECORDING

[75] Inventors: Wilhelmus Janssens, Aarschot; Luc Vanmaele, Lochristi, both of Belgium

[73] Assignee: AGFA-Gevaert N.V., Mortsel, Belgium

[21] Appl. No.: 251,772

[22] Filed: May 27, 1994

[30] Foreign Application Priority Data

Jun. 3, 1993 [EP] European Pat. Off. ............ 93201586

[51] Int. Cl.6 ...................... B41M 5/035; B41M 5/38
[52] U.S. Cl. .................................... 503/227; 428/195; 428/336; 428/500; 428/522; 428/913; 428/914; 430/203
[58] Field of Search .................... 8/471; 428/195, 913, 428/914, 336, 500, 522; 430/199–203

[56] References Cited

U.S. PATENT DOCUMENTS 4,632,895 12/1986 Patel et al. ........................ 430/201
5,196,393 3/1993 Kubodera et al. ................. 503/227

FOREIGN PATENT DOCUMENTS 0453020 10/1991 European Pat. Off. ............ 503/227

Primary Examiner—B. Hamilton Hess
Attorney, Agent, or Firm—Brumbaugh, Graves, Donohue & Raymond

[57] ABSTRACT

Dye donor element for use according to thermal dye sublimation transfer comprising a support having thereon a dye layer, wherein said dye layer comprises at least one heterocyclic isoxazolone dye.

8 Claims, No Drawings

DYE-DONOR ELEMENTS FOR THERMAL DYE TRANSFER RECORDING

1. Field of the Invention

The present invention relates to dye-donor elements for use in thermal dye sublimation transfer methods and to dyes for use in said dye-donor elements.

2. Background of the Invention

Thermal dye sublimation transfer also called thermal dye diffusion transfer is a recording method in which a dye-donor element provided with a dye layer containing sublimable dyes having heat transferability is brought into contact with a receiver sheet and selectively, in accordance with a pattern information signal, is heated by means of a thermal printing head provided with a plurality of juxtaposed heat-generating resistors, so that dye is transferred from the selectively heated regions of the dye-donor element to the receiver sheet and forms a pattern thereon, the shape and density of which is in accordance with the pattern and intensity of heat applied to the dye-donor element.

A dye-donor element for use according to thermal dye sublimation transfer usually comprises a very thin support e.g. a polyester support, one side of which has been covered with a dye layer comprising the printing dyes. Usually, an adhesive or subbing layer is provided between the support and the dye layer. Normally, the opposite side of the support is covered with a slipping layer that provides a lubricated surface against which the thermal printing head can pass without suffering abrasion. An adhesive layer may be provided between the support and the slipping layer.

A dye-image receiving element for use according to thermal dye sublimation transfer usually comprises a support, e.g., paper or a transparant film coated with a dye-image receiving layer, into which the dye can diffuse more readily. An adhesive layer may be provided between the support and the receiving layer. A releasing agent may be contained in the receiving layer or in a separate layer on top of said receiving layer to improve the releasability of the receiving element from the donor element after the dye transfer has been effected.

The dye layer can be a monochromic dye layer or it may comprise sequential repeating areas of differently coloured dyes e.g. dyes having a cyan, magenta, yellow, and optionally black-colour hue. When a dye-donor element containing three or more primary colour dye areas is used, a multicolour image can be obtained by sequentially performing the dye transfer process steps for each colour area.

Black-coloured images can be obtained by thermal dye sublimation transfer printing either by sequentially performing the dye transfer process steps for the three primary colours cyan, magenta, and yellow by means of a dye-donor element comprising sequential repeating areas of cyan, magenta, and yellow coloured dyes or by performing only one transfer step by means of a dye-donor element having a black-coloured dye layer containing a mixture of yellow, magenta, and cyan coloured image dyes. The latter of these two methods is preferred because of i.a. the ease of manufacturing the donor element containing only one dye area, less time-consuming recording with only one transfer step, and avoiding the problem of transfer in register of the respective dyes in the respective dye areas. Mixtures of yellow, magenta, and cyan dyes for forming a black-coloured dye layer of such a black-coloured dye-donor element have been described in e.g. European patent application 579299, EP 453,020, U.S. Pat. No. 4,816,435, and JP 01/136,787.

An important application of the recording of monochromic black images by thermal dye sublimation transfer is the recording on transparant film receiver of hard copies of medical diagnostic images formed by e.g. ultrasound techniques. Such a hard copy is considered to be an ecologically more acceptable and more convenient substitute for the black-and-white silver hard copy formed by development of conventional photographic silver halide film materials where processing solutions comprising silver salt residues have to be treated carefully before disposal.

In order to be a really valid substitute for conventional photographic silver halide materials the black-coloured mixture of organic dyes used in thermal dye sublimation transfer printing should behave optically as black silver. To reach that goal there is a constant search for dyes having a high molar extinction coefficient, good transfer characteristics, and a high sublimation and diffusion rate. For accomplishing a really satisfactory black-coloured mixture of organic dyes these dyes should have high spectral side absorptions, whereas for full colour work low side absorptions are preferred. As a consequence less dyes and/or smaller amounts of dyes would needed to obtain higher density values. In the absence of dyes that meet these requirements overcharging of the polymer binder of the dye layer with classical dyes is often required. Unfortunately, such overcharging leads to crystallization of the dyes and/or to tackiness of the dye layer.

3. Summary of the Invention

It is therefore an object of the present invention to provide a dye-donor element comprising dyes that have a high molar extinction coefficient.

It is another object of the present invention to provide a dye-donor element comprising dyes that have a high molar extinction coefficient combined with high spectral side absorptions.

It is a further object of the present invention to provide a dye-donor element yielding transferred dye images having high density.

Further objects will become apparent from the description hereinafter.

In accordance with the present invention a dye donor element for use according to thermal dye sublimation transfer is provided, said dye donor element comprising a support having a thickness of 2 to 30 um and having thereon a dye layer, wherein said dye layer comprises at least one heterocyclic isoxazolone dye.

According to a preferred embodiment of the present invention said at least one heterocyclic isoxazolone dye corresponds to the following general formula (I):

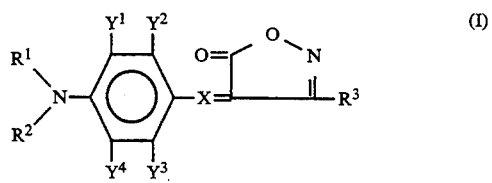

wherein:

X represents $-N=$ or $-C(R^4)=$, preferably $-CH=$ or $-C(CN)=$, each of $R^1$ and $R^2$ independently represents hydrogen, a $C_1$–$C_{10}$-alkyl group, preferably methyl or ethyl, a substituted $C_1$–$C_{10}$-alkyl group, a $C_5$–$C_7$-cycloalkyl group, a substituted $C_5$–$C_7$-cycloalkyl group, a $C_1$–$C_{10}$-alkenyl group, a substituted $C_1$–$C_{10}$-alkenyl group, a $C_1$–$C_{10}$-alkynyl group, a substituted $C_1$–$C_{10}$-alkynyl group, an allyl group, or a substituted allyl group, $R^1$ and $R^2$ being same or different, or $R^1$ and $R^2$ together with the nitrogen atom, to which they are attached, complete a 5- to 7-membered heterocyclic nucleus, which may carry substituents, $R^3$ represents hydrogen, a $C_1$–$C_{10}$-alkyl group, a substituted $C_1$–$C_{10}$-alkyl group, a $C_5$–$C_7$-cycloalkyl group, a substituted $C_5$–$C_7$-cycloalkyl group, a $C_1$–$C_{10}$-alkenyl group, a substituted $C_1$–$C_{10}$-alkenyl group, a $C_1$–$C_{10}$-alkynyl group, a substituted $C_1$–$C_{10}$-alkynyl group, an allyl group, a substituted allyl group, an aryl group, a substituted aryl group, a hetaryl group, a substituted hetaryl group, —$N(R^5)R^6$, —$OR^7$, —$COOR^7$, or —$CONR^5R^6$, $R^4$ represents hydrogen or any substituent, preferably an electron-withdrawing group, each of $R^5$ and $R^6$ independently represents hydrogen, a $C_1$–$C_{10}$-alkyl group, a substituted $C_1$–$C_{10}$-alkyl group, a $C_5$–$C_7$-cycloalkyl group, a substituted $C_5$–$C_7$-cycloalkyl group, a $C_1$,$C_{10}$-alkenyl group, a substituted $C_1$–$C_{10}$-alkenyl group, a $C_1$–$C_{10}$-alkynyl group, a substituted $C_1$–$C_{10}$-alkynyl group, an allyl group, a substituted allyl group, an acyl group, a substituted acyl group, an aryl group, a substituted aryl group, a hetaryl group, or a substituted hetaryl group, $R^5$ and $R^6$ being same or different, or $R^5$ and $R^6$ together with the nitrogen atom, to which they are attached, complete a 5- to 7-membered heterocyclic nucleus, which may carry substituents, $R^7$ represents a $C_1$–$C_{10}$-alkyl group, a substituted $C_1$–$C_{10}$-alkyl group, a $C_5$–$C_7$-cycloalkyl group, a substituted $C_5$–$C_7$-cycloalkyl group, a $C_1$–$C_{10}$-alkenyl group, a substituted $C_1$–$C_{10}$-alkenyl group, a $C_1$–$C_{10}$-alkynyl group, a substituted $C_1$–$C_{10}$-alkynyl group, an allyl group, a substituted allyl group, an aryl group, a substituted aryl group, a hetaryl group, or a substituted hetaryl group, and each of $Y^1$, $Y^2$, $Y^3$, and $Y^4$ independently represents hydrogen, a halogen atom, an alkyl group, a substituted alkyl group, a cycloalkyl group, a substituted cycloalkyl group, an allyl group, a substituted allyl group, an alkyloxy group, a substituted alkyloxy group, an aryloxy group, a substituted aryloxy group, thiocyanato, an acylamido group, a substituted acylamido group, an ureido group, a substituted ureido group, an N-alkyl- or N,N-dialkyl-substituted sulfamoyl group, an N-aryl or N,N-diaryl-substituted sulfamoyl group, an N-alkyl- or N,N-dialkyl-substituted carbamoyl group, an N-aryl- or N,N-diaryl-substituted carbamoyl group, an alkylthio group, a substituted alkylthio group, an arylthio group, a substituted arylthio group, trifluoromethyl, or a cyano group, or the pair of $Y^1$ and $Y^2$ and/or the pair of $Y^3$ and $Y^4$ together represent the atoms needed to complete a 5- or 6-membered carbocyclic or heterocyclic nucleus, which may carry substituents, or $Y^1$ and/or $Y^4$ represent the atoms needed to complete together with $R^1$ and $R^2$ respectively and the nitrogen atom, to which $R^1$ and $R^2$ are attached, a 5- or 6-membered nucleus, which may carry substituents.

According to another preferred embodiment of the present invention said at least one heterocyclic isoxazolone dye corresponds to the following general formula (II):

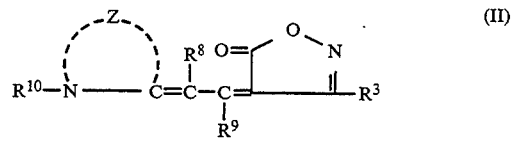

wherein:

$R^3$ has the same significance as defined for the above general formula (I), each of $R^8$ and $R^9$ independently represents hydrogen, a $C_1$–$C_{10}$-alkyl group, a substituted $C_1$–$C_{10}$-alkyl group, a $C_5$–$C_7$-cycloalkyl group, a substituted $C_5$–$C_7$-cycloalkyl group, a $C_1$–$C_{10}$-alkenyl group, a substituted $C_1$–$C_{10}$-alkenyl group, a $C_1$–$C_{10}$-alkynyl group, a substituted $C_1$–$C_{10}$-alkynyl group, an allyl group, a substituted allyl group, an aryl group, or a substituted aryl group, $R^8$ and $R^9$ being same or different, $R^{10}$ represents hydrogen, a $C_1$–$C_{10}$-alkyl group, preferably methyl, a substituted $C_1$–$C_{10}$-alkyl group, a $C_5$–$C_7$-cycloalkyl group, a substituted $C_5$–$C_7$-cycloalkyl group, a $C_1$–$C_{10}$-alkenyl group, a substituted $C_1$–$C_{10}$-alkenyl group, a $C_1$–$C_{10}$-alkynyl group, a substituted $C_1$–$C_{10}$-alkynyl group, an allyl group, a substituted allyl group, a $C_6$–$C_{10}$-aryl group, or a substituted $C_6$–$C_{10}$-aryl group, and Z represents the atoms needed to complete a heterocyclic nucleus, a substituted heterocyclic nucleus, a heterocyclic nucleus carrying a fused-on cycloaliphatic, aromatic, or heterocyclic ring or ring system, or a substituted heterocyclic nucleus carrying a fused-on cycloaliphatic, aromatic, or heterocyclic ring or ring system.

The present invention also provides a dyed receiving element comprising a dye in image-wise distribution, formed by thermal dye sublimation transfer using a dye-donor element according to the present invention.

The present invention also provides a method of forming an image by image-wise heating a dye-donor element comprising a support having a thickness of 2 to 30 um and having thereon a dye layer comprising a binder and at least one dye, wherein said dye is a heterocyclic isoxazolone dye, and causing transfer of the image-wise heated dye to a receiver sheet.

According to a preferred embodiment of the method of the present invention said at least one heterocyclic isoxazolone dye corresponds to the above general formula (I).

According to another preferred embodiment of the method of the present invention said at least one heterocyclic isoxazolone dye corresponds to the above general formula (II).

4. Detailed Description of the Invention

The heterocyclic isoxazolone dye can be prepared by condensation of the isoxazolone with an appropriate aldehyde or nitroso-aniline. The azomethine dyes can also be prepared by oxidative coupling of the isoxazolone with a p-phenylene diamine. The cyano-substituted dyes can be prepared by oxidative cyanation. The synthesis of the dyes is illustrated by means of the preparation examples given hereinafter.

Preparation example 1: synthesis of dye 1.01

Dye 1.01 is prepared according to the following reaction scheme:

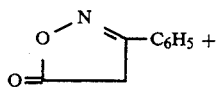

Compound A

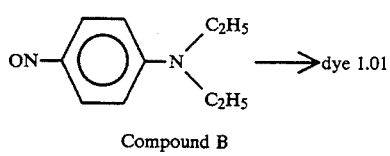

Compound B 10 g (0.062 mol) of compound A and 11.6 g (0.0651 mol) of compound B are dissolved in 100 ml of ethanol. A few drops of methanesulfonic acid are added to the solution. Next, the solution is refluxed for 20 min. After cooling the crystals are filtered, rinsed with methanol, and dried.

Yield: 10.1 g of dye 1.01 melting at 120° C. (decomposing)

Preparation example 2: synthesis of dye 1.04

Dye 1.04 is prepared according to the following reaction scheme:

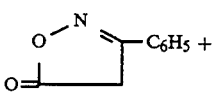

Compound A

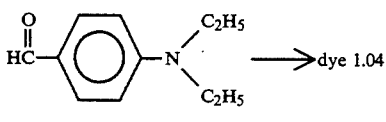

Compound C 10 g (0. 062 tool) of compound A and 12.1 g (0.068 tool) of compound C are dissolved in 100 ml of toluene. A few drops of methanesulfonic acid are added to the solution and water is removed azeotropically. Toluene is removed under reduced pressure and the residue is recrystallized from ethanol/methoxypropanol. The crystals are filtered, rinsed with methanol, and dried.

Yield: 17 g of dye 1.04 melting at 122° C.

Preparation example 3: synthesis of dye 1.05

9 g (0.028 mol) of dye 1.04 and 1.8 g (0.028 mol) of potassium cyanide are heated to 50° C. in 50 ml of dimethyl sulfoxide. After 1 h at 50° C. 7.2 g of iodine is added. The mixture is stirred for 20 min. After cooling ethyl acetate is added and the resulting solution is rinsed with water. The organic layer is dried and concentrated under reduced pressure. The residue is purified by column chromatography with dichloromethane/ethyl acetate (97:3).

Yield: 3.5 g of dye 1.05 melting at 114° C.

Preparation example 4: synthesis of dye 2.01

Dye 2.01 is prepared according to the following reaction scheme:

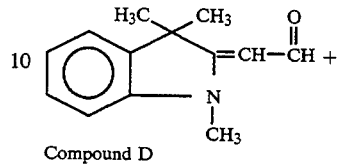

Compound D

10 g (0.050 mol) of compound D and 8 g (0.050 mol) of compound A are dissolved in 100 ml of ethanol. A few drops of methanesulfonic acid are added to the solution. Next, the solution is refluxed for 1 h. After cooling the product is filtered, rinsed with ethanol, and dried.

Yield: 13.8 g of dye 2.01 melting at 227° C.

Other dyes listed in Tables 1 and 2 hereinafter can be prepared analogously as described in the above preparation examples.

Dyes listed in Table 3 can be prepared according to methods known to those skilled in the art of organic synthesis. By way of example the preparation of dye 3.04 is described hereinafter.

Preparation example 5: synthesis of dye 3.04

Dye 3.04 is prepared according to the following reaction scheme:

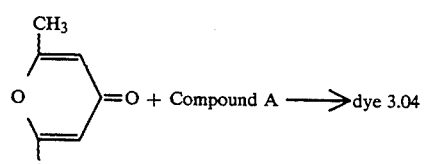

Compound E 6.2 g (0.05 mol) of compound E is dissolved in 56 ml of acetic anhydride. The solution is heated to 100° C. 8.1 g (0.05 mol) of compound A is dissolved in 40 ml of sulfolane at 40° C. The latter solution is slowly added to the solution of compound E at 100° C. with stirring. Stirring is continued for 2 h. The reaction mixture is cooled to 50° C. and poured into a mixture of 200 ml of methanol and 200 g of ice. The precipitate is filtered, rinsed with methanol, and dried.

Yield: 8.8 g of dye 3.04, which can be recrystallized from methanol. Melting point: 200° C.

A non-exhaustive list of dyes corresponding to the above general formula I is given in Table 1 hereinafter.

TABLE 1

| Dye | $R^1$ | $R^2$ | $R^3$ | $Y^1, Y^2, Y^3, Y^4$* | X |
|---|---|---|---|---|---|
| 1.01 | ethyl | ethyl | phenyl | — | —N= |
| 1.02 | ethyl | ethyl | phenyl | $Y^3$ = methyl | —N= |
| 1.03 | ethyl | ethyl | phenyl | $Y^3$ = acetamido | —N= |
| 1.04 | ethyl | ethyl | phenyl | — | —CH= |
| 1.05 | ethyl | ethyl | phenyl | — | —C(CN)= |
| 1.06 | ethyl | ethyl | 3-pyridyl | — | —N= |
| 1.07 | ethyl | ethyl | ethyl | — | —N= |
| 1.08 | ethyl | ethyl | 3-pyridyl | — | —CH= |

TABLE 1-continued

| Dye | R¹ | R² | R³ | Y¹, Y², Y³, Y⁴* | X |
|---|---|---|---|---|---|
| 1.09 | ethyl | ethyl | ethyl | — | —CH= |
| 1.10 | ethyl | ethyl | 3-pyridyl | — | —C(CN)= |
| 1.11 | ethyl | ethyl | ethyl | — | —C(CN)= |
| 1.12 | methyl | methyl | phenyl | — | —N= |
| 1.13 | allyl | allyl | phenyl | — | —N= |
| 1.14 | ethyl | ethyl | phenyl | Y¹ = methyl | —CH= |
| 1.15 | ethyl | ethyl | phenyl | Y¹ = methyl | —C(CN)= |
| 1.16 | ethyl | ethyl | phenyl | Y¹ = acetamido | —CH= |
| 1.17 | ethyl | ethyl | phenyl | Y¹ = acetamido | —C(CN)= |
| 1.18 | R¹ + R² complete a morpholine ring | | phenyl | — | —CH= |
| 1.19 | Y⁴ + R² complete a quinoline ring | | phenyl | — | —C(CN)= |
| 1.20 | Y³ + Y⁴ complete a benzene ring | | phenyl | — | —C(CN)= |

*means that each of Y¹, Y², Y³, Y⁴ stands for hydrogen unless otherwise stated.

Other representatives of dyes that can be used advantageously in the dye-donor element according to the present invention correspond to the above general formula (II). They are listed in Table 2 hereinafter.

TABLE 2

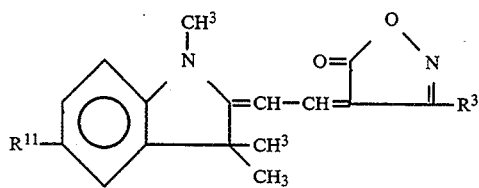

| Dye | R³ | R¹¹ |
|---|---|---|
| 2.01 | phenyl | —H |
| 2.02 | phenyl | methoxycarbonyl |
| 2.03 | phenyl | methoxy |
| 2.04 | ethyl | —H |
| 2.05 | ethyl | methoxycarbonyl |
| 2.06 | 3-pyridyl | —H |

Other representatives of heterocyclic isoxazolone dyes that can be used in the dye-donor element according to the present invention are listed in the following Table 3.

TABLE 3

Dye 3.01

$$H_5C_2 \diagdown N \diagup \bigcirc -HN-N= \underset{C_6H_5}{\overset{O=\diagup O\diagdown N}{\diagdown \diagup \| }}$$
with $H_5C_2$ on N 3.02

$H_5C_2$–N($H_5C_2$)–⌬–N=N–⌬–NH–N=[isoxazolone]–$C_6H_5$ 3.03

[structure with $C_6H_5$, $H_3C$—N, $H_3C$, =O, isoxazolone, $C_6H_5$]

3.04

[structure with $CH_3$, O, $CH_3$, isoxazolone, $C_6H_5$]

TABLE 3-continued

| Dye | |
|---|---|
| 3.05 | (structure) |
| 3.06 | (structure) |
| 3.07 | (structure) |
| 3.08 | (structure) |

The heterocyclic isoxazolone dyes can be used as filter dyes e.g. for silver halide colour photographic materials and also as antihalation dyes. They can be used in inkjet printing, resistive ribbon printing, in inks e.g. for laser applications, in textile, in lacquers, and in paints. They can also be used for transfer printing on fabrics and for the preparation of colour filter array elements.

According to a preferred embodiment of the present invention the heterocyclic isoxazolone dyes are used in the dye layer of a dye-donor element for thermal dye sublimation transfer.

The dye layer of the dye-donor element is formed preferably by adding the heterocyclic isoxazolone dyes, a polymeric binder medium, and other optional components to a suitable solvent or solvent mixture, dissolving or dispersing by ball-milling these ingredients to form a coating composition that is applied to a support, which may have been provided first with an adhesive or subbing layer, and dried.

The dye layer thus formed has a thickness of about 0.2 to 5.0 µm, preferably 0.4 to 2.0 µm, and the amount ratio of dye. to binder ranges from 9:1 to 1:3 by weight, preferably from 2:1 to 1:2 by weight.

The following polymers can be used as polymeric binder: cellulose derivatives, such as ethyl cellulose, hydroxyethyl cellulose, ethylhydroxy cellulose, ethylhydroxyethyl cellulose, hydroxypropyl cellulose, methyl cellulose, cellulose nitrate, cellulose acetate formate, cellulose acetate hydrogen phthalate, cellulose acetate, cellulose acetate propionate, cellulose acetate butyrate, cellulose acetate pentanoate, cellulose acetate benzoate, cellulose triacetate; vinyl-type resins and derivatives, such as polyvinyl alcohol, polyvinyl acetate, polyvinyl butyral, copolyvinyl butyral-vinyl acetal-vinyl alcohol, polyvinyl pyrrolidone, polyvinyl acetoacetal, polyacrylamide; polymers and copolymers derived from acrylates and acrylate derivatives, such as polyacrylic acid, polymethyl methacrylate and styrene-acrylate copolymers; polyester resins; polycarbonates; poly(styrene-co-acrylonitrile);polysulfones; polyphenylene oxide; organosilicones such as poly-siloxanes; epoxy resins and natural resins, such as gum arabic. Preferably, the binder for the dye layer of the present invention comprises cellulose acetate butyrate or poly(styrene-co-acrylonitrile).

The dye-donor element of the present invention can be used for the recording of a coloured image together with primary colour dye-donor elements comprising respectively a magenta dye or a mixture of magenta dyes, a cyan dye or a mixture of cyan dyes and a yellow dye or a mixture of yellow dyes.

Any dye can be used in such a primary colour dye layer provided it is easily transferable to the dye-image-receiving layer of the receiver sheet by the action of heat.

The dyes of the present invention can be used alone or mixed with one another, or even mixed with other primary colour dyes.

Typical and specific examples of other primary colour dyes for use in thermal dye sublimation transfer have been described in e.g. EP 209,990, EP 209,991, EP 216,483, EP 218,397, EP 227,095, EP 227,096, EP 229,374, EP 235,939, EP 247,737, EP 257,577, EP 257,580, EP 258,856, EP 279,330, EP 279,467, EP 285,665, U.S. Pat. Nos. 4,743,582, 4,753,922, 4,753,923, 4,757,046, 4,769,360, 4,771,035, 5,026,677, JP 84/78,894, JP 84/78,895, JP 84/78,896, JP 84/227,490, JP 84/227,948, JP 85/27,594, JP 85/30,391, JP 85/229,787, JP 85/229,789, JP 85/229,790, JP 85/229,791, JP 85/229,792, JP 85/229,793, JP 85/229,795, JP 86/41,596, JP 86/268,493, JP 86/268,494, JP 86/268,495, and JP 86/284,489.

The coating layer may also contain other additives, such as curing agents, preservatives, organic or inorganic fine particles, dispersing agents, antistatic agents, defoaming agents, viscosity-controlling agents, these and other ingredients having been described more fully in EP 133,011, EP 133,012, EP 111,004, and EP 279,467.

Any material can be used as the support for the dye-donor element provided it is dimensionally stable and capable of withstanding the temperatures involved, up to 400° C. over a period of up to 20 msec, and is yet thin enough to transmit heat applied on one side through to the dye on the other side to effect transfer to the receiver sheet within such short periods, typically from 1 to 10 msec. Such materials include polyesters such as polyethylene terephthalate, polyamides, polyacrylates, polycarbonates, cellulose esters, fluorinated polymers, polyethers, polyacetals, polyolefins, polyimides, glassine paper and condenser paper. Preference is given to a support comprising polyethylene terephthalate. In general, the support has a thickness of 2 to 30 μm. The support may also be coated with an adhesive of subbing layer, if desired.

The dye layer of the dye-donor element can be coated on the support or printed thereon by a printing technique such as a gravure process.

A dye-barrier layer comprising a hydrophilic polymer may also employed between the support and the dye layer of the dye-donor element to enhance the dye transfer densities by preventing wrong-way transfer of dye backwards to the support. The dye barrier layer may contain any hydrophilic material that is useful for the intended purpose. In general, good results have been obtained with gelatin, polyacrylamide, polyisopropyl acrylamide, butyl methacrylate-grafted gelatin, ethyl methacrylate-grafted gelatin, ethyl acrylate-grafted gelatin, cellulose monoacetate, methylcellulose, polyvinyl alcohol, polyethyleneimine, polyacrylic acid, a mixture of polyvinyl alcohol and polyvinyl acetate, a mixture of polyvinyl alcohol and polyacrylic acid, or a mixture of cellulose monoacetate and polyacrylic acid. Suitable dye barrier layers have been described in e.g. EP 227,091 and EP 228,065. Certain hydrophilic polymers e.g. those described in EP 227,091 also have an adequate adhesion to the support and the dye layer, so that the need for a separate adhesive or subbing layer is avoided. These particular hydrophilic polymers used in a single layer in the dye-donor element thus perform a dual function, hence are referred to as dye-barrier/subbing layers.

Preferably the reverse side of the dye-donor element has been coated with a slipping layer to prevent the printing head from sticking to the dye-donor element. Such a slipping layer would comprise a lubricating material such as a surface-active agent, a liquid lubricant, a solid lubricant or mixtures thereof, with or without a polymeric binder. The surface-active agents may be any agents known in the art such as carboxylates, sulfonates, phosphates, aliphatic amine salts, aliphatic quaternary ammonium salts, polyoxyethylene alkyl ethers, polyethylene glycol fatty acid esters, fluoroalkyl $C_2$–$C_{20}$ aliphatic acids. Examples of liquid lubricants include silicone oils, synthetic oils, saturated hydrocarbons, and glycols. Examples of solid lubricants include various higher alcohols such as stearyl alcohol, fatty acids and fatty acid exters. Suitable slipping layers have been described in e.g. EP 138,483, EP 227,090, U.S. Pat. Nos. 4,567,113, 4,572,860, 4,717,711. Preferably the slipping layer comprises a styreneacrylonitrile copolymer or a styrene-acrylonitrile-butadiene copolymer or a mixture thereof or a polycarbonate as described in European patent application 5275220, as binder and a polysiloxanepolyether copolymer or polytetrafluoroethylene or a mixture thereof as lubicrant in an amount of 0.1 to 10% by weight of the binder or binder mixture.

The support for the receiver sheet that is used with the dye-donor element may be a transparent film of e.g. polyethylene terephthalate, a polyether sulfone, a polyimide, a cellulose ester or a polyvinyl alcohol-co-acetal. The support may also be a reflective one such as a baryta-coated paper, polyethylene-coated paper or white polyester i.e. white-pigmented polyester. Blue-coloured polyethylene terephthalate film can also be used as support.

To avoid poor adsorption of the transferred dye to the support of the receiver sheet this support must be coated with a special layer called dye-image-receiving layer, into which the dye can diffuse more readily. The dye-image-receiving layer may comprise e.g. a polycarbonate, a polyurethane, a polyester, a polyamide, polyvinyl chloride, polystyrene-co-arcylonitrile, polycaprolactone, or mixtures thereof. The dye-image receiving layer may also comprise a heat-cured product of poly(vinyl chloride/co-vinyl acetate/co-vinyl alcohol) and polyisocyanate. Suitable dye-image-receiving layers have been described in e.g. EP 133,011, EP 133,012, EP 144,247, EP 227,094, and EP 228,066.

In order to improve the light-fastness and other stabilities of. recorded images UV-absorbers, singlet oxygen quenchers such as HALS-compounds (Hindered Amine Light Stabilizers) and/or antioxidants can be incorporated into the dye-image-receiving layer.

The dye layer of the dye-donor element or the dye-image-receiving layer of the receiver sheet may also contain a releasing agent that aids in separating the dye-donor element from the receiver sheet after transfer. The releasing agents can also be incorporated in a separate layer on at least part of the dye layer and/or of the dye-image-receiving layer. Suitable releasing agents are solid waxes, fluorine- or phosphate-containing surface-active agents and silicone oils. Suitable releasing agents have been described in e.g. EP 133,012, JP 85/19,138, and EP 227,092.

The dye-donor elements according to the invention are used to form a dye transfer image, which process comprises placing the dye layer of the dye-donor element in face-to-face relation with the dye-image-receiving layer of the receiver sheet and image-wise heating preferably from the back of the dye-donor element. The amount of dye transferred is a function of the amount of heat supplied thereby forming a continuous tone image.

When the process is performed for but one single colour, a monochromic dye transfer image is obtained. A multicolour image can be obtained by using a dye-donor element containing three or more primary colour dyes and sequentially performing the process steps described above for each colour. The above sandwich of dye-donor element and receiver sheet is formed on three occasions during the time when heat is applied by the thermal printing head. After the first dye has been transferred, the elements are peeled apart. A second dye-donor element (or another area of the dye-donor element with a different dye area) is then brought in register with the dye-receiving element and the process is repeated. The third colour and optionally further colours are obtained in the same manner.

In addition to thermal heads, laser light, infrared flash, or heated pens can be used as the heat source for supplying heat energy. Thermal printing heads that can be used to transfer dye from the dye-donor elements of the present invention to a receiver sheet are commercially available. In case laser light is used, the dye layer or another layer of the dye element has to contain a compound that absorbs the light emitted by the laser and converts it into heat e.g. carbon black.

Alternatively, the support of the dye-donor element may be an electrically resistive ribbon consisting of e.g. a multilayer structure of a carbon-loaded polycarbonate coated with a thin aluminium film. Current is injected into the resistive ribbon by electrically addressing a printing head electrode resulting in highly localized heating of the ribbon beneath the relevant electrode.

The fact that in this case the heat is generated directly in the resistive ribbon and that it is thus the ribbon that gets hot leads to an inherent advantage in printing speed using the resistive ribbon/electrode head technology as compared to the thermal head technology, according to which the various elements of the thermal head get hot and must cool down before the head can move to the next printing position.

The following examples illustrate the invention in more detail without, however, limiting the scope thereof.

EXAMPLE 1

The absorption maxima ($\lambda_{max}$) and extinction maxima ($\epsilon_{max}$) of the dyes identified below were determined in methanol (unless otherwise mentioned). The melting points were determined on a Kofler hot stage. The results are listed in Table 4.

TABLE 4

| Dye | melting at °C. | $\lambda_{max}$ (nm) | $\epsilon_{max}$ |
|---|---|---|---|
| 1.01 | 120 (decomp.) | 540 | 46900 |
| 1.02 | 152 | 546 | 50900 |
| 1.03 | 180 (decomp.) | 548 | 54800 |
| 1.04 | 122 | 484 | 67000 |
| 1.05 | 114 | 588 | 33986 |
| 2.01 | 227 | 480 | 76040 |
| 3.04 | 200 | 392 | 28923 |
| 3.08 | 176 | 430 | 63500 |

EXAMPLE 2

Receiver sheets were prepared by coating a subbed polyethylene terephthalate film having a thickness of 175 μm with a dye-image-receiving layer from a solution in ethyl methyl ketone of 3.6 g/m² of poly(vinyl chloride/co-vinyl acetate/co-vinyl alcohol) (Vinylite VAGD supplied by Union Carbide), 0.336 g/m² of diisocyanate (Desmodur VL Supplied by Bayer AG), and 0.2 g/m² of hydroxy-modified polydimethylsiloxane (Tegomer H SI 2111 supplied by Goldschmidt).

Dye-donor elements for use according to thermal dye sublimation transfer were prepared as follows.

A solution in methyl ethyl ketone of 0.5% by weight of dye and 0.5% by weight of poly(styrene-co-acrylonitrile) (PSA) (Luran 388S, supplied by BASF Germany) was prepared.

A dye layer having a wet thickness of 100 μm was coated from this solution on a polyethylene terephthalate film support having a thickness of 6 μm and carrying a conventional subbing layer. The resulting dye layer was dried by evaporation of the solvent.

The opposite side of the film support was coated with a subbing layer of a copolyester comprising ethylene glycol, adipic acid, neopentyl glycol, terephthalic acid, isophthalic acid, and glycerol.

The resulting subbing layer was covered with a solution in ethyl methyl ketone of 0.5 g/m² of a polycarbonate having the following structural formula to form a heat-resistant layer:

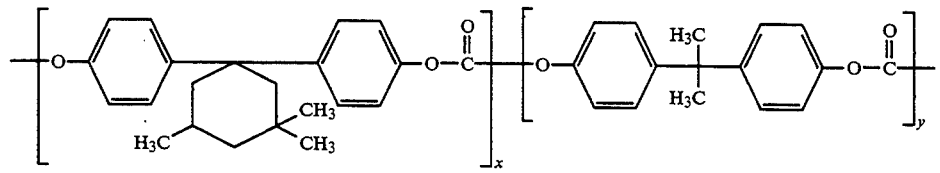

wherein x=55 mol % and y=45 mol %.

Finally, a top layer of polyether-modified polydimethylsiloxane (Tegoglide 410, Goldschmidt) was coated from a solution in isopropanol on the resulting heat-resistant polycarbonate layer.

The dye-donor element was printed in combination with a receiver sheet in a Mitsubishi colour video printer CP100E.

The receiver sheet was separated from the dye-donor element and the colour density value of the recorded image was measured in reflex by means of a Macbeth TR 924 densitometer in the red, green, and blue regions in Status A mode.

The above described experiment was repeated for each of the dyes identified in Table 5 hereinafter.

The results are listed in Table.5.

TABLE 5

| Dye | Dmax | Spectral absorption in Status A behind filter | | |
|---|---|---|---|---|
| | | Red | Green | Blue |
| 1.01 | 234 | 37 | 150 | 28 |
| 1.02 | 238 | 51 | 150 | 33 |
| 1.03 | 182 | 21 | 150 | 26 |
| 1.04 | 104 | 9 | 63 | 150 |
| 1.05 | 135 | 150 | 105 | 18 |
| 2.01 | 138 | 9 | 20 | 150 |
| 3.08 | 211 | 10 | 15 | 150 |

EXAMPLE 3

Composition of High Density Black-Coloured Dye Mixtures According to the Present Invention Receiver sheets were prepared as described in Example 2.

Black dye-donor elements were prepared as follows:

The amounts of dyes as indicated in the following Table 6 were added each time to 10 ml of a solution of 0.5% by weight of poly(styrene-co-acrylonitrile) (Luran 388S, supplied by BASF Germany) in ethyl methyl ketone. The resulting black-coloured dye mixtures were coated, printed, and evaluated as described in the above Example 2.

The results of the tests are listed in the following Table 6.

The prior art dyes C-cyan, C-magenta, and C-yellow having the following structural formulae were used for comparison in the tests.

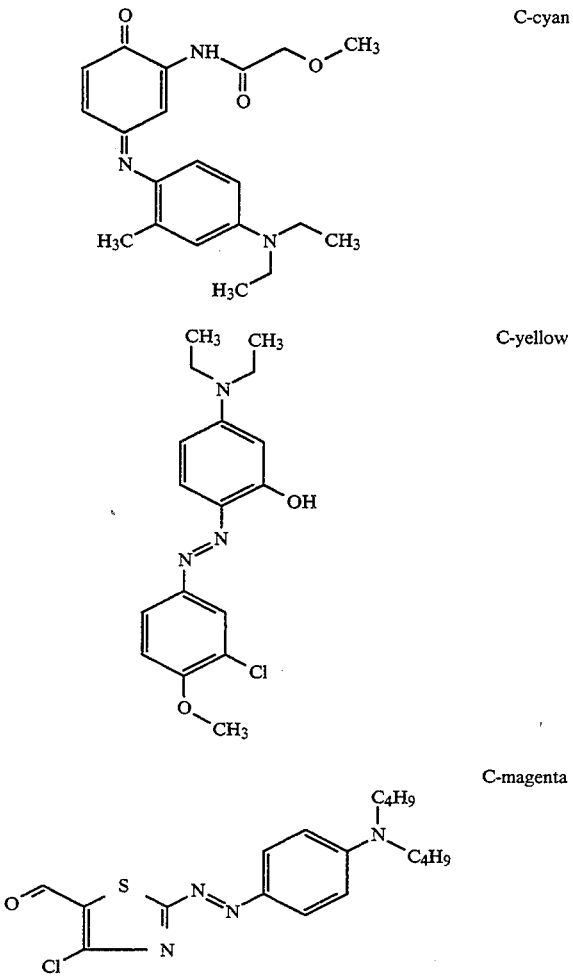

These comparison dyes can be prepared as described in U.S. Pat. No. 5,169,828 and the corresponding EP 453,020.

TABLE 6

| Test No | Dye | Amount of dye in mg | Spectral absorption in Status A behind filter | | | |
|---|---|---|---|---|---|---|
| | | | Red | green | blue | visual |
| 1 | C-cyan | 30 | 254 | 203 | 159 | 223 |
| | C-magenta | 50 | | | | |
| | C-yellow | 30 | | | | |
| 2 | C-cyan | 50 | 218 | 319 | 209 | 261 |
| | 1.01 | 50 | | | | |
| | C-yellow | 30 | | | | |
| 3 | C-cyan | 30 | 161 | 256 | 193 | 214 |
| | 1.02 | 50 | | | | |
| | C-yellow | 30 | | | | |
| 4 | C-cyan | 30 | 115 | 268 | 174 | 177 |
| | 1.03 | 50 | | | | |

TABLE 6-continued

| Test No | Dye | Amount of dye in mg | Spectral absorption in Status A behind filter | | | |
|---|---|---|---|---|---|---|
| | | | Red | green | blue | visual |
| | C-yellow | 30 | | | | |
| 5 | C-cyan | 30 | 273 | 243 | 107 | 255 |
| | C-magenta | 50 | | | | |
| | 1.04 | 30 | | | | |

Test N° 1 relates to a black-coloured prior art dye mixture as described in U.S. Pat. No. 5,169,828.

The results listed in Table 6 show that by means of dye-donor elements incorporating a dye mixture comprising a heterocyclic isoxazolone dye according to the present invention transferred dye images can be made, which have black density values that equal those of a prior art dye mixture.

We claim:

1. Dye-donor element for thermal dye sublimation transfer, said dye donor element comprising a support having a thickness of 2 to 30 μm and having thereon a dye layer, wherein said dye layer comprises at least one isoxazolone dye which absorbs radiation primarily outside the infrared range.

2. A dye-donor element according to claim 1, wherein the said dye layer contains a binder selected from the group consisting of cellulose acetate butyrate and poly(styrene-co-acrylonitrile).

3. A dye-donor element according to claim 1, wherein said dye layer has a thickness of 0.4 to 2.0 μm and the amount ratio of dye to binder ranges from 2:1 to 1:2 by weight.

4. Method of forming an image by image-wise heating a dye-donor element comprising a support having a thickness of 2 to 30 μm and having thereon a dye layer comprising a binder and at least one dye, wherein said dye is an isoxazolone dye which absorbs radiation primarily outside the infrared range, and causing transfer of the image-wise heated dye to a receiver sheet.

5. Dye-donor element for thermal dye sublimation transfer, said dye donor element comprising a support having a thickness of 2 to 30 μm and having thereon a dye layer, wherein said dye layer comprises at least one isoxazolone dye, wherein said isoxazolone dye corresponds to general formula (I):

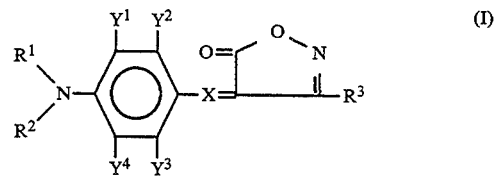

wherein:

X represents —N= or —C(R⁴)=, each of $R^1$ and $R^2$ independently represents hydrogen, a $C_1$–$C_{10}$-alkyl group, a $C_5$–$C_7$-cycloalkyl group, a $C_1$–$C_{10}$-alkenyl group, a $C_1$–$C_{10}$-alkynyl group, or an allyl group, $R^1$ and $R^2$ being same or different, or $R^1$ and $R^2$ together with the nitrogen atom, to which they are attached, complete a 5- to 7-membered heterocyclic nucleus, $R^3$ represents hydrogen, a $C_1$–$C_{10}$-alkyl group, a $C_5$–$C_7$-cycloalkyl group, a $C_1$–$C_{10}$-alkenyl group, a $C_1$–$C_{10}$-alkynyl group, an allyl group, an aryl group, a hetaryl group, —N(R$^5$)R$^6$, —OR$^7$, —COOR$^7$, or —CONR$^5$R$^6$, R$^4$ represents hydrogen or CN, each of R$^5$ and R$^6$ independently represents hydrogen, a C$_1$–C$_{10}$-alkyl group, a C$_5$–C$_7$-cycloalkyl group, a C$_1$–C$_{10}$-alkenyl group, a C$_1$–C$_{10}$-alkynyl group, an allyl group, an acyl group, an aryl group, or a hetaryl group, R$^5$ and R$^6$ being same or different, or R$^5$ and R$^6$ together with the nitrogen atom, to which they are attached, complete a 5- to 7-membered heterocyclic nucleus, R$^7$ represents a C$_1$–C$_{10}$-alkyl group, a C$_5$–C$_7$-cycloalkyl group, a C$_1$–C$_{10}$-alkenyl group, a C$_1$–C$_{10}$-alkynyl group, an allyl group, an aryl group, or a hetaryl group, and each of Y$^1$, Y$^2$, Y$^3$, and Y$^4$ independently represents hydrogen, a halogen atom, an alkyl group, a cycloalkyl group, an allyl group, an alkyloxy group, an aryloxy group, thiocyanato, an acylamido group, an ureido group, an N-alkyl- or N,N-dialkyl-substituted sulfamoyl group, an N-aryl- or N,N-diaryl-substituted sulfamoyl group, an N-alkyl- or N,N-dialkyl-substituted carbamoyl group, an N-aryl- or N,N-diaryl-substituted carbamoyl group, an alkylthio group, an arylthio group, trifluoromethyl, or a cyano group, or the pair of Y$^1$ and Y$^2$ and/or the pair of Y$^3$ and Y$^4$ together represent the atoms needed to complete a 5- or 6-membered carbocyclic or heterocyclic nucleus, or Y$^1$ and/or Y$^4$ represent the atoms needed to complete together with R$^1$ and R$^2$ respectively and the nitrogen atom, to which R$^1$ and R$^2$ are attached, a 5- or 6-membered nucleus.

6. Method of forming an image by image-wise heating a dye-donor element comprising a support having a thickness of 2 to 30 μm and having thereon a dye layer comprising a binder and at least one dye, wherein said dye is a isoxazolone dye which corresponds to general formula

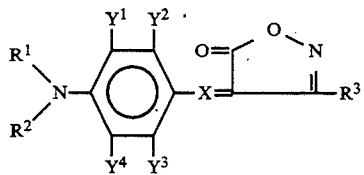

(I)

wherein:

X represents —N= or —C(R$^4$)=, each of R$^1$ and R$^2$ independently represents hydrogen, a C$_1$–C$_{10}$-alkyl group, a C$_5$–C$_7$-cycloalkyl group, a C$_1$–C$_{10}$-alkenyl group, a C$_1$–C$_{10}$-alkynyl group, or an allyl group, R$^1$ and R$^2$ being same or different, or R$^1$ and R$^2$ together with the nitrogen atom, to which they are attached, complete a 5- to 7-membered heterocyclic nucleus, R$^3$ represents hydrogen, a C$_1$–C$_{10}$-alkyl group, a C$_5$–C$_7$-cycloalkyl group, a C$_1$–C$_{10}$-alkenyl group, a C$_1$–C$_{10}$-alkynyl group, an allyl group, an aryl group, a hetaryl group, —N(R$^5$)R$^6$, —OR$^7$, —COOR$^7$, or —CONR$^5$R$^6$, R$^4$ represents hydrogen or CN, each of R$^5$ add R$^6$ independently represents hydrogen, a C$_1$–C$_{10}$-alkyl group, a C$_5$–C$_7$-cycloalkyl group, a C$_1$–C$_{10}$-alkenyl group, a C$_1$–C$_{10}$-alkynyl group, an allyl group, an acyl group, an aryl group, or a hetaryl group, R$^5$ and R$^6$ being same or different, or R$^5$ and R$^6$ together with the nitrogen atom, to which they are attached, complete a 5- to 7-membered heterocyclic nucleus, R$^7$ represents a C$_1$–C$_{10}$-alkyl group, a C$_5$–C$_7$-cycloalkyl group, a C$_1$–C$_{10}$-alkenyl group, a C$_1$–C$_{10}$-alkynyl group, an allyl group, an aryl group, or a hetaryl group, and each of Y$^2$ Y$^3$ and Y$^4$, independently represents hydrogen, a halogen atom, an alkyl group, a cycloalkyl group, an allyl group, an alkyloxy group, an aryloxy group, thiocyanato, an acylamido group, an ureido group, an N-alkyl- or N,N-dialkyl-substituted sulfamoyl group, an N-aryl- or N,N-diaryl-substituted sulfamoyl group, an N-alkyl- or N,N-dialkyl-substituted carbamoyl group, an N-aryl- or N,N-diaryl-substituted carbamoyl group, an alkylthio group, an arylthio group, trifluoromethyl, or a cyano group, or the pair of Y$^1$ and Y$^2$ and/or the pair of Y$^3$ and Y$^4$ together represent the atoms needed to complete a 5- or 6-membered carbocyclic or heterocyclic nucleus, or Y$^1$ and/or Y$^4$ represent the atoms needed to complete together with R$^1$ and R$^2$ respectively and the nitrogen atom, to which R$^1$ and R$^2$ are attached, a 5- or 6-membered nucleus, and causing transfer of the image-wise neared dye to a receiver sheet.

7. Dye-donor element for thermal dye sublimation transfer, said dye donor element comprising a support having a thickness of 2 to 30 μm and having thereon a dye layer, wherein said dye layer comprises at least one isoxazolone dye, wherein said isoxazolone dye corresponds to general formula (II):

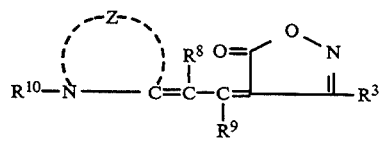

(II)

wherein:

R$^3$ represents hydrogen, a C$_1$–C$_{10}$-alkyl group, a C$_5$–C$_7$-cycloalkyl group, a C$_1$–C$_{10}$-alkenyl group, a C$_1$–C$_{10}$-alkynyl group, an allyl group, an aryl group, a hetaryl group, —N(R$^5$)R$^6$, —OR$^7$, —COOR$^7$, or —CONR$^5$R$^6$, each of R$^5$ and R$^6$ independently represents hydrogen, a C$_1$–C$_{10}$-alkyl group, a C$_5$–C$_7$-cycloalkyl group, a C$_1$–C$_{10}$-alkenyl group, a C$_1$–C$_{10}$-alkynyl group, an allyl group, an acyl group, an aryl group, a hetaryl group, or R$^5$ and R$^6$ being same or different, or R$^5$ and R$^6$ together with the nitrogen atom, to which they are attached, complete a 5- to 7-membered heterocyclic nucleus, R$^7$ represents a C$_1$–C$_{10}$-alkyl group, a C$_5$–C$_7$-cycloalkyl group, a C$_1$–C$_{10}$-alkenyl group, a C$_1$–C$_{10}$-alkynyl group, an allyl group, an aryl group, or a hetaryl group, each of R$^8$ and R$^9$ independently represents hydrogen, a C$_1$–C$_{10}$-alkyl group; a C$_5$–C$_7$-cycloalkyl group, a C$_1$–C$_{10}$-alkenyl group, a C$_1$–C$_{10}$-alkynyl group, an allyl group, or an aryl group, R$^8$ and R$^9$ being same or different, R$^{10}$ represents hydrogen, a C$_1$–C$_{10}$-alkyl group, a C$_5$–C$_7$-cycloalkyl group, a C$_1$–C$_{10}$-alkenyl group, a C$_1$–C$_{10}$-alkynyl group, an allyl group, a C$_6$–C$_{10}$-aryl group, and Z represents the atoms needed to complete a heterocyclic nucleus, a heterocyclic nucleus carrying a fused-on cycloaliphatic, aromatic, or heterocyclic ring or ring system.

8. Method of forming an image by image-wise heating a dye-donor element comprising a support having a thickness of 2 to 30 μm and having thereon a dye layer comprising a binder and at least one dye, wherein said dye is a isoxazolone dye which corresponds to general formula (II):

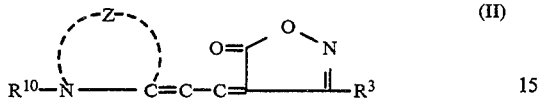

wherein:

$R^3$ represents hydrogen, a $C_1$–$C_{10}$-alkyl group, a $C_5$–$C_7$-cycloalkyl group, a $C_1$–$C_{10}$-alkenyl group, a $C_1$–$C_{10}$-alkynyl group, an allyl group, an aryl group, a hetaryl group, —N($R^5$)$R^6$, —O$R^7$, -13 COO$R^7$, or —CON$R^5R^6$, each of $R^5$ and $R^6$ independently represents hydrogen, a $C_1$–$C_{10}$-alkyl group, a $C_5$–$C_7$-cycloalkyl group, a $C_1$–$C_{10}$-alkenyl group, a $C_1$–$C_{10}$-alkynyl group, an allyl group, an acyl group, an aryl group, or a hetaryl group, $R^5$ and $R^6$ being same or different, or $R^5$ and $R^6$ together with the nitrogen atom, to which they are attached, complete a 5- to 7-membered heterocyclic nucleus, $R^7$ represents a $C_1$–$C_{10}$-alkyl group, a $C_5$–$C_7$-cycloalkyl group, a $C_1$–$C_{10}$-alkenyl group, a $C_1$–$C_{10}$-alkynyl group, an allyl group, an aryl group, or a hetaryl group, each of $R^8$ and $R^9$ independently represents hydrogen, a $C_1$–$C_{10}$-alkyl group, a $C_5$–$C_7$-cycloalkyl group, a $C_1$–$C_{10}$-alkenyl group, a $C_1$–$C_{10}$-alkynyl group, an allyl group, or an aryl group, $R^8$ and $R^9$ being same or different, $R^{10}$ represents hydrogen, a $C_1$–$C_{10}$-alkyl group, a $C_5$–$C_7$-cycloalkyl group, a $C_1$–$C_{10}$-alkenyl group, a $C_1$–$C_{10}$-alkynyl group, an allyl group, a $C_6$–$C_{10}$-aryl group, and Z represents the atoms needed to complete a heterocyclic nucleus, a heterocyclic nucleus carrying a fused-on cycloaliphatic, aromatic, or heterocyclic ring or ring system, and causing transfer of the image-wise heated dye to a receiver sheet.

* * * * *

UNITED STATES PATENT AND TRADEMARK OFFICE
CERTIFICATE OF CORRECTION

PATENT NO. : 5,422,334
DATED : June 6, 1995
INVENTOR(S) : Janssens et al.

It is certified that error appears in the above-indentified patent and that said Letters Patent is hereby corrected as shown below:

Column 2, line 27, "would" should read --would be--;

Column 5, lines 41 and 42, "tool" should read --mol--;

Column 18, line 7, "Y$^2$" should read --Y$^1$, Y$^2$,--;

Column 18, line 26, "neared" should read --heated--;

Column 18, line 39, delete "R$^9$" from formula (II);

Column 18, line 52, "a" should read --or a--;

Column 18, line 52, "or R$^5$" should read --R$^5$--;

Column 19, bridging lines 21-22, "-13 COOR$^7$" should read -- -COOR$^7$--.

Signed and Sealed this

Thirteenth Day of February, 1996

Attest:

BRUCE LEHMAN

*Attesting Officer*   *Commissioner of Patents and Trademarks*